United States Patent [19]

Lomet et al.

[11] Patent Number: 5,212,788
[45] Date of Patent: May 18, 1993

[54] SYSTEM AND METHOD FOR CONSISTENT TIMESTAMPING IN DISTRIBUTED COMPUTER DATABASES

[75] Inventors: David B. Lomet, Westford; Philip A. Bernstein, Carlisle, both of Mass.; James Johnson, Newbury, England; Kenneth Wilner, Merrimack, N.H.

[73] Assignee: Digital Equipment Corporation, Maynard, Mass.

[21] Appl. No.: 527,087

[22] Filed: May 22, 1990

[51] Int. Cl.⁵ .................. G06F 7/00; G06F 15/40
[52] U.S. Cl. .................. 395/600; 364/282.4; 364/284.3; 364/284.4; 364/281.4; 364/DIG. 1
[58] Field of Search .............. 395/600; 364/DIG. 1, 364/DIG. 2

[56] References Cited

U.S. PATENT DOCUMENTS

| | | | |
|---|---|---|---|
| 4,569,015 | 2/1986 | Dolev et al. | 364/200 |
| 4,627,019 | 12/1986 | Ng | 364/900 |
| 4,631,673 | 12/1986 | Haas et al. | 364/300 |
| 4,635,189 | 1/1987 | Kendall | 364/200 |
| 4,714,992 | 12/1987 | Gladney et al. | 364/200 |
| 4,725,834 | 2/1988 | Chang et al. | 340/825.5 |

OTHER PUBLICATIONS

"Concurrency Control in Distributed Database Systems" Phillip A. Berstein et al., Computing Surveys, vol. 13, No. 2, Jun. 1981.

"Implementing Atomic Actions on Decentralized Data" David Reed, ACM Trans on on Computer Syst., vol. 1, No. 2/83 pp. 3-23.

"Analyzing Concurrency Control Algorithms when User and System Operators Differ" P. A. Bernstein et al., VSE-Q IEEE Transactions on Software Engineering No. 3 pp. 233-239.

"Optimistic Concurrency Control for Abstract Data Types" by Maurice Herlihy; ACM 0-89791-19-8-918610800-0206.

"Super Databases for Composition of Heterogeneous Databases", Dalton PU 1988 IEEE Ch 25502/88/0000/0548 pp. 548-555.

Primary Examiner—David L. Clark
Assistant Examiner—Paul R. Lintz
Attorney, Agent, or Firm—Flehr, Hohbach, Test, Albritton & Herbert

[57] ABSTRACT

A distributed database system has a plurality of databases located at distinct nodes, at least one of the databases comprising a timestamping database. Distributed transactions are committed using a two phase protocol. During the first phase, each cohort to the transaction votes to commit or abort the transaction, and also votes an earliest time and a latest time at which the transaction is to be committed. If all the cohorts vote to commit the transaction and the intersection of the voted time ranges is not empty, then the transaction is committed during the second phase of the protocol. A transaction time is selected from the intersection of the voted time ranges and is used to timestamp all updated data that is durably stored when the transaction is committed. Before the first phase of the two phase commit protocol, each transaction read or write locks data at each node for which it needs read or write access. Whenever a transaction enters the first phase of the commit protocol, read locks for that transaction can be converted into delay locks. Any transaction which obtains a write lock on delay locked data is a "delayed transaction". The delayed transaction votes a time range which guarantees that it will commit at a time which is later than the time at which the transactions with the delay locks commit. This combination of time range voting and delay locking ensures that the timestamp order of transactions is consistent throughout the distributed database and is consistent with a valid serialization order of the transactions.

11 Claims, 2 Drawing Sheets

PRIOR ART

SYSTEM AND METHOD FOR CONSISTENT TIMESTAMPING IN DISTRIBUTED COMPUTER DATABASES

The present invention relates generally to distributed database systems and multiversion databases, and is particularly related to methods and systems for tagging data entered into such databases with consistent timestamps.

BACKGROUND OF THE INVENTION

A multiversion database is one which can be queried (i.e., asked or interrogated) as to what the state of the database was at a specified time. In such multiversion databases, also called temporal databases, all updated data is "stamped" with a time value, usually with a time value corresponding to the time at which the data was updated. With the appropriate support (i.e., software), a query of the timestamped database can provide a transaction consistent view of the database as it existed at a specified time. Such temporal queries can be of use in financial applications, medical record systems, engineering design, and so on.

The present invention focuses on transaction time. All updates made by a transaction to a database are stamped with the same time. The timestamp is stored as an attribute of the data. The timestamps of transactions must be ordered correctly so that the order of the timestamps represents a correct serialization of the transactions.

Transaction time can also be used to organize data. The idea is that data that is no longer current can be stored separately from current data. The "historical" data is never updated, and hence can be stored on "write-once, read many" (WORM) optical disks. Data that is current may continue to be updated, and is therefore stored on magnetic disks and in random access memory so that the current data can be readily modified. However, as will be appreciated by those skilled in the art, all timestamped data could be stored on magnetic disk or it could all be kept on a WORM disk.

Timestamping data with the time of the transaction that entered it is not a new idea, and many articles on this subject appear in the computer science literature. Timestamps have been suggested as a way of performing concurrency control. Most of the efforts at using timestamps in this way, however, have not turned up in system implementations.

What the present invention provides, that has not be provided in the prior art, is a method of consistently timestamping data in a distributed database without unduly hurting the system's performance, and also providing a "delay lock" mechanism which facilitates the processing of multiple transactions which partially overlap in time while compromising neither the reliability of the data being used nor the consistency of the timestamps on the data.

SUMMARY OF THE INVENTION

In summary, the present invention is a system and method for ensuring consistent timestamping in a distributed database system. The system has databases located at a number of distinct nodes, and at least two of the nodes have timestamping databases—that is, multiversion databases in which updated data is stamped with a transaction time, and which can be queried as to the state of the database as of a specified time.

Distributed transactions are committed or aborted using a two phase commit protocol. During the first phase of the protocol, called the prepare interval, each cohort to the transaction votes on whether to commit or abort the transaction, and also votes on an earliest time and a latest time at which the transaction is to be committed. If all the cohorts to a transaction vote to commit the transaction and the intersection of the voted time ranges is not empty, then the transaction is committed during the second phase of the protocol. Also a transaction time is selected from the intersection of the voted time ranges, and this selected transaction time is used to timestamp all updated data that is durably stored when the transaction is committed.

By having each cohort vote on a time range for committing the transaction, the protocol ensures that a timestamp is selected which is useable by all the cohorts. Another aspect of the present invention concerns data locking by distributed transactions. In particular, before the prepare interval of the two phase commit protocol, each transaction read or write locks data at each node for which it needs read or write access. Whenever a transaction enters the first phase of the commit protocol (the prepare interval), read locks for that transaction are converted into a new type of data lock herein called a delay lock. A delay lock is similar to a read lock, except that it allows another transaction to obtain a write lock on the data. However, any transaction which obtains a write lock on delay locked data is a "delayed transaction". During the first phase of the commit protocol, the cohort in the delayed transaction which contains the write lock on delay locked data votes a time range having an "earliest" value which is later than the "latest" value voted by the transactions that own the delay locks. In other words, the delayed transaction votes a time range which guarantees that it will commit at a time which is later than the time at which the transactions with the delay locks commit or abort.

This combination of time range voting and a delay lock mechanism ensure that the timestamp order of transactions is consistent throughout the distributed database and is consistent with the true serialization order of the transactions. It also permits optimization of the commit protocol itself, which enhances performance of the system.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
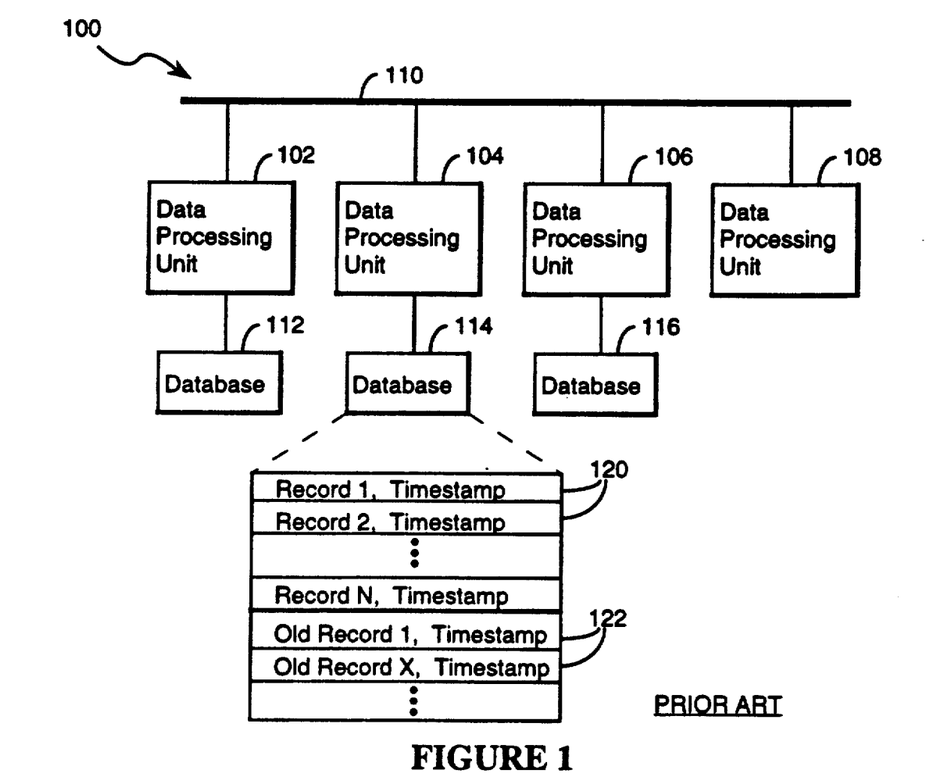
FIG. 1 is a block diagram of a distributed database system.

Referring to FIG. 1, there is shown a distributed database system 100. Typical examples of distributed databases include airline reservation systems, financial databases maintained by banks and brokerage firms, and a medical record database maintained by a large organization. The system includes a large number of individual nodes 102-108, which are data processing units interconnected by a bus, local area network, or wide area network 110. The data processing units in a system 100 typically include both work stations and more powerful minicomputers or mainframe computers. A plurality of the data processing units store a portion 112-116 of the distributed database in their own memory.

Furthermore, each datum or record 120 in the distributed database is timestamped, which means that along with the datum or record is stored a consistent set of time values indicative of the order in which the values in those records were last updated. In addition, to the current values of the records stored in the database, the database preferably also stores old versions of records 122 which have since been updated. By storing data which has been superceded by updated values, the database enables one to determine the status of the database at any specified time in the past.

DEFINITIONS

For the purposes of this description, several terms will be defined as follows.

To "commit" a transaction means that the results of a transaction are installed in a data base. The ability to commit implies that the database system must be capable of not installing the results of a transaction if the transaction is aborted.

"Conflicting transactions" are two or more transactions including at least one transaction which may, at least potentially, access data updated by another one of the transactions. Thus the results generated by at least one of the conflicting transactions will depend on the order in which the transactions are performed.

A "data lock" is a mechanism for assigning exclusive rights to a datum or record in a data base. Thus a first transaction may lock a particular piece of data so as to ensure that no other transaction accesses that data until the first transaction commits or aborts. The prior art includes many types of data locking mechanisms, sometimes called data interlocks.

To "prepare" a transaction means to start the process of determining whether to commit the transaction, which means durably storing all new data values generated by the transaction, or to abort the transaction. The "prepare-interval" of a transaction is the time period beginning with preparation of the transaction and ending with when the transaction is either committed or aborted.

TWO PHASE COMMIT PROTOCOL

Figure 2:
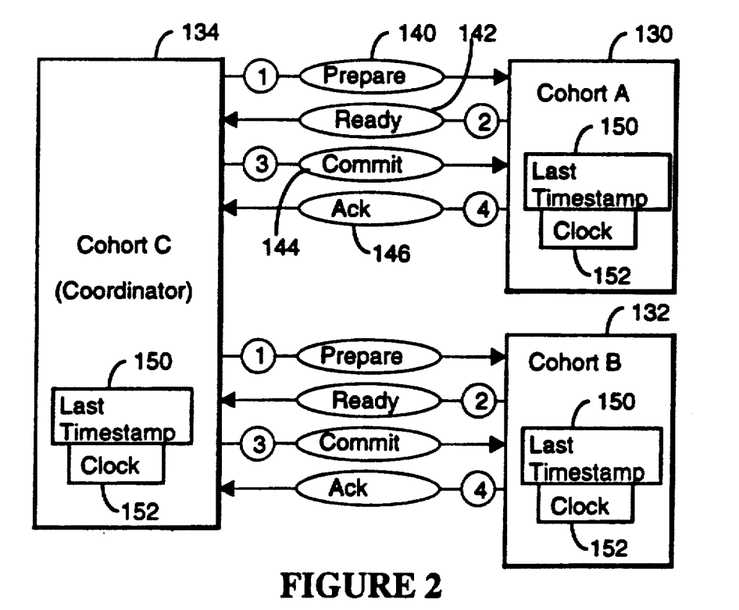
FIG. 2 depicts the sequence of events in a two phase commit protocol.

Referring to FIG. 2, we will now describe classical "two-phase commit", herein called "2PC". 2PC is the protocol which is most widely used for serializing transactions in distributed systems. Basically, two-phase commit protocols work as follows. A transaction T1 involves at least two data processing units. For example, the transaction may involve three of the data processing units in the system, herein called Cohort A 130, Cohort B 132 and Cohort C 134. Assuming that nothing goes wrong during execution of the transaction T1, each cohort performs the computations associated with the transaction and temporarily stores any results of the transaction in such a way that the transaction can still be reversed or aborted, thereby leaving the database unchanged. As will be understood by those skilled in the art, there are a number of different methods of doing this, and the particular method used for making the transaction reversible is not important to the present invention.

At some point in the transaction, one of the cohorts, here Cohort C, is assigned the role of "coordinator" of the two phase commit protocol. The coordinator sends a first message, called a Prepare message 140, which notifies all cohorts to the distributed transaction that the transaction is now to be terminated, and hopefully committed. Each cohort to the transaction then attempts to Prepare itself. Essentially, this means that the cohort must make certain that it can guarantee that both the state of the database before the transaction and the state of the database after the transaction are durably stored. The cohort thus checks that either one of these states can be guaranteed to be installed, depending on whether the transaction COMMITs or ABORTs.

Each cohort then votes on the disposition of the transaction by sending a READY or ABORT message 142 back to the coordinator. If the attempt by a cohort to prepare fails, or any preceding step of the transaction fails, the cohort votes to ABORT. If the attempt to prepare succeeds, then the cohort votes to COMMIT. Any cohort that has voted to COMMIT is said to be prepared.

When the coordinator has received votes from all the cohorts participating in the transaction, it knows the disposition of the transaction. The coordinator COMMITs the transaction if all cohorts have voted COMMIT. If any cohort voted ABORT, or a cohort fails to respond to the Prepare message within a predefined amount of time, then the coordinator ABORTs the transaction. In either case the coordinator sends a transaction disposition message 144 (i.e., COMMIT or ABORT) to all cohorts.

When a cohort receives the transaction disposition message, it terminates the transaction according to its direction. If the disposition is COMMIT, the cohort installs updated data values in the database. If the disposition is ABORT, the state of the database before the transaction is re-installed. The cohorts send an acknowledgement message 146 back to the coordinator 134 upon stably storing the transaction disposition.

It should be noted that the cohort 134 Which acts as Coordinator performs the same functions as the other cohorts during the 2PC protocol, except that the coordinator knows at the beginning of the process whether or not that cohort will be able to commit the transaction. Furthermore, this cohort goes through the prepare and commit phases of the transaction. For all intents and purposes, the coordinator can be thought of as a separate entity, even though it runs on the node of the system occupied by one of the cohorts.

It should be noted that there are a number of multi-phase commit protocols known in the prior art. There are also a number of different versions of the two-phase commit protocol described above. The present invention can be used with any protocol in which each cohort communicates with a transaction coordinator, and where the coordinator informs all cohorts of the transaction disposition. As will be described below, the present invention provides a method of using these messages to agree upon a transaction time.

CHOOSING A TRANSACTION TIMESTAMP.

The transaction timestamp to be selected is the time value that will be stored with all data updates caused by a particular transaction. The basic mechanism used by the present invention is to extend the 2PC protocol by augmenting the information conveyed on two of its messages.

In general, the present invention requires that each cohort inform the transaction coordinator of its requirements for transaction time. The coordinator then attempts to find a single time that satisfies all cohort requirements.

Each data processing unit in the system 100 stores and maintains a monotonically increasing LAST transaction time 150. It does this by comparing the value of LAST with the timestamp of each committed transaction. Whenever one of these timestamps is later than LAST 150, LAST is set to the value of the timestamp. Each cohort also has an internal clock 152 which specifies the local current time for that cohort.

Figure 4:
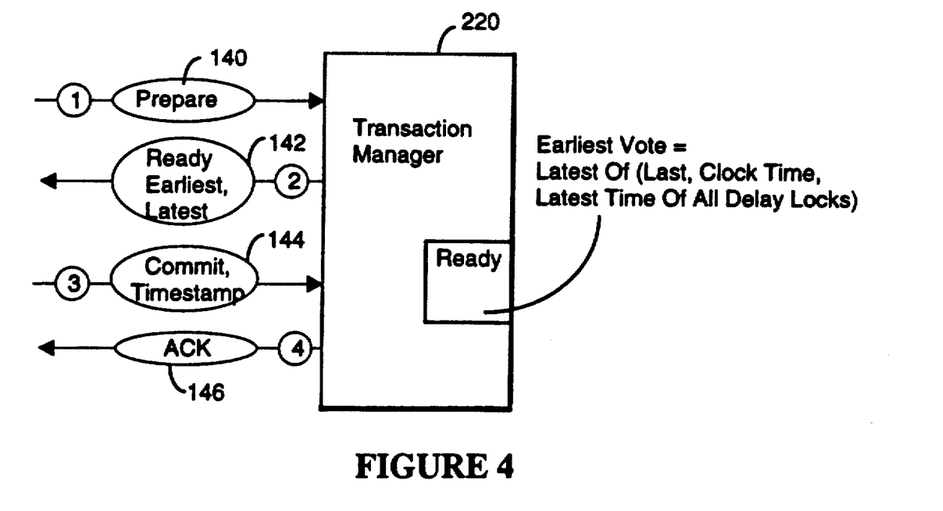
FIG. 4 depicts a two phase commit protocol incorporating additional time range information in accordance with the present invention.

Referring to FIG. 4, whenever a cohort votes to commit a transaction at message number two of the 2PC protocol, it also conveys two time values: the EARLIEST time at which the transaction can be permitted to commit, and the LATEST time that the transaction can be permitted to commit. The EARLIEST time must be later than the time of any other transaction in that database upon which the current transaction depends. When the cohort/database receives a request to commit from the coordinator, and it is prepared to commit the transaction, it votes an EARLIEST transaction time which is larger than both the LAST timestamp value 150 and its current clock time.

The LATEST transaction time specified by each node is used to establish bounds on how divergent transaction times can become among the nodes. Thus the purpose of the LATEST parameter is not serialization, but rather to limit clock and transaction time divergence.

The coordinator is required to find a transaction time that is within all the [EARLIEST, LATEST] time ranges voted by the cohorts. If the intersection of these ranges is null, the coordinator ABORTs the transaction.

A heavily used database may place more stringent requirements, i.e., require smaller time ranges to be specified by each cohort, than a lightly used database. It may need the tight bounds to increase concurrency by reducing the amount of time that the transaction is in doubt. On the other hand, a database on a workstation might be willing to accept almost any timestamp that a host database might agree to during a distributed transaction, so long as transaction time order and transaction time serialization agree. Such a database might not vote a LATEST bound.

DATA LOCKS

Figure 3:
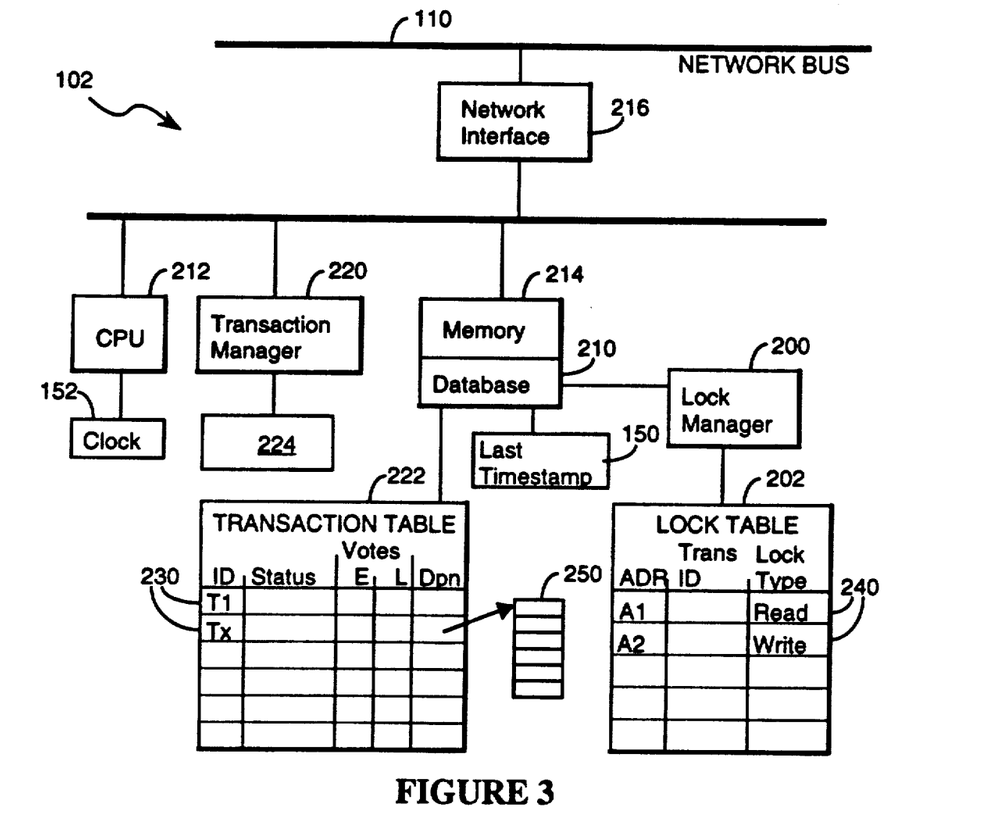
FIG. 3 is a block diagram of one node in a distributed database system.

Referring to FIG. 3, each node 102 in the distributed database system includes lock manager 200 and a lock table 202 which are used to keep track of data locks on data that is stored in the database 210 at that node. In other words, every node has its own lock manager 200 and lock table 202.

The node also contains a data processor (CPU) 212, and internal clock 152, and a memory module 214 used to store the database 210. Whenever this discussion refers to a "database system" at one node, this refers to the database software and data denoted by reference numeral 210 in FIG. 3. The database system will typically be implemented as one or more processes or execution threads running on the CPU 212. In some applications, the database system could be implemented as a distinct set of hardware with its own CPU, memory, and so on.

The memory module 214 includes both random access memory and mass storage such as a hard magnetic disk. A network interface 216 couples the node to the other cohorts via the communications network 110 (which is typically the bus of a local or wide area network).

As will be described in more detail below, each node 102 has a transaction manager 220 for handling all communications between cohorts to a transaction. These components of the node 102 are typically pieces of software which reside in a common memory and are executed concurrently by a multiprocessing CPU 212.

Before a transaction reads or writes any data in any node, it first must request a lock on that data. The lock manager 200 grants a request for a read lock only if the data that is being accessed is either unlocked, or has a read lock granted to another transaction. The lock manager grants a request for a write lock only if the data that is being accessed is unlocked. Thus there can be more than one read lock on a datum, but a datum with a write lock on it can only have that one lock. Each new lock which is granted is denoted by an entry 240 in the lock table 202. Each lock entry 240 denotes the address of the datum or other system resource which is being locked, the identity of the transaction which requested and "owns" the lock, and the lock mode (e.g., read or write). Also recorded are requests from transactions that are blocked, waiting for a lock.

READ-ONLY COHORTS

A read-only cohort is a cohort that has no updates and usually does not need to receive the COMMIT message in the 2PC protocol—because it has no data to install nor any other activity that it needs to perform. It can merely release its data locks at Prepare time (i.e., upon receiving the PREPARE message from the coordinator).

However, this raises a problem as to how soon the data that has been unlocked can be updated. With the need for correct ordering of transaction times, we must be sure that subsequent transactions that update this data are given timestamps later than the transaction that released the data locks. Hence, it would perhaps be preferable to release these read locks only after the time that the first transaction commits or aborts. The problem is how to preserve this read-only optimization (i.e., using less messages for read-only cohorts) when the read-only cohort will never be told what timestamp has been assigned to the transaction.

The solution is for the read-only cohort to send its READY to commit vote with a closed timestamp range of [EARLIEST, LATEST]. The read-only cohort now knows that the transaction will terminate at a time which is no later than the time it provided in the LATEST value sent with its COMMIT message. Hence, it can free its read locks at the LATEST time, without every knowing the precise time that the transaction terminated. This methodology ensures that the "prepare intervals" of conflicting transactions are disjoint, even without knowing the actual commit time of the transactions. And this assures that timestamp order (i.e., the order associated with timestamps in the database) agrees with serialization order (i.e., the actual order in which transactions were committed).

TRANSACTION TABLE

Each database maintains a transaction table 222. For each transaction in which the database is a cohort, the database creates an entry or record 230 in the transaction table 222. Each transaction record 240 denotes the identity of the transaction and the status of the transaction: active (i.e., computing or not prepared), prepared, or committed. The record 240 also denotes the EARLIEST and LATEST times voted (or to be voted) by that cohort. The information in the transaction table 222 will be used in conjunction with committing transactions that use locked data, as will be described below.

The transaction manager 220 also maintains a transaction table 224 for transactions which have been prepared, but which are not yet completed. For non-timestamping databases, the transaction manager stores in the table 224 a "last commit" value, which is equal to the latest timestamp value for any transaction in which the non-timestamping database was a cohort.

DELAY LOCKS

The present invention provides a mechanism for making read-only data (i.e., data that a transaction needs to be able to read but does not need to be able to update) available to subsequent transactions during its prepare-interval. In addition, this mechanism delays the committing of any other transaction that subsequently uses this data so that the other transaction does not commit until after the transaction that "released" the data.

In particular, the present invention provides a new data lock mode called a Delay lock. The idea of a Delay lock is as follows. At prepare time, a transaction transforms all its read locks to Delay locks. At commit time, the Delay locks are released (i.e., erased or eliminated from the lock table).

A Delay lock does not conflict with any other lock mode. In other words, if a datum is "delay locked", another transaction can obtain either a read or a write lock on that data. However, whenever a transaction write locks data that is delay locked, that transaction is not permitted to commit until after the Delay lock is dropped. This requirement is needed to ensure that the timestamp order of transactions agrees with their serialization order.

Rather than delaying commit processing of the second transaction per se, the above described timestamping requirement is performed as follows. Whenever a transaction write locks data that is delay locked, that transaction establishes a lower bound on its Earliest time vote for the transaction time. More particularly, during preparation of the "delayed" transaction, the Earliest time voted by the cohort which obtained the Write lock is the latest time among the following time values: (1) the LAST value for that cohort (i.e., the time of the last transaction in that node to commit), (2) clock time, and (3) the LATEST time of all the Delay locks of the transactions encountered by the cohort during the processing of the transaction.

The LATEST time of each Delay lock is determined as follows. Whenever a Write lock is requested for a datum having a Delay lock, the lock manager 220 in the cohort with the Delay lock notes the transaction holding the Delay lock. When the writing transaction commits, its commit timestamp must be later than either the LATEST time voted by the Delay lock holding transaction, if that transaction is still prepared, or the commit time of that transaction, if that transaction has committed.

This method of setting a lower bound on the EARLIEST time to be voted by cohorts which obtain write locks assures that conflicting transactions continue to have disjoint prepare-intervals, and hence that timestamp order and serialization order agree.

There are two preferred method of implementing Delay locks. One is to have the transaction manager 220 explicitly request that the lock manager 200 downgrade the read locks for a transaction to Delay locks whenever that transaction becomes prepared. In other words, the lock type for these locks would be changed from "read" to "delay". Whenever a transaction requests a write lock for data that is delay locked, the above described steps would be performed to establishes a lower bound on the Earliest time vote for the transaction which requested the write lock.

A second method of implementing Delay locks avoids explicitly downgrading read locks to delay locks by the lock manager 200 and hence avoids an additional call to the lock manager 200 when a transaction prepares. In this second method, read locks are released only when the transaction (i.e., the transaction which owns the locks) commits.

Any subsequent transaction that encounters a read lock, and that is requesting a write lock on the locked data, consults the transaction table 222 to determine the disposition of the transaction(s) which owns the read lock(s) on the locked data. In other words, whenever the lock manager 200 receives a write lock request from a subsequent transaction for a read locked datum, the lock manager 200 consults the transaction table 222 to determine the disposition of the transaction(s) which owns the read lock(s) on the locked data.

If the transaction holding the Read lock is active (i.e., not prepared), then the write request is treated as a standard read-write conflict and the requesting transaction is blocked. When the transaction holding the Read lock prepares, this read lock is implicitly downgraded to a delay lock by the change in the status of the transaction as denoted in the transaction table 222. A transaction requesting a Write lock on the now Delay locked data is permitted to proceed. Further, blocked Write request transactions are now permitted to proceed.

If the transaction holding the Read lock is prepared, the read lock is treated as a delay lock, and the requested write lock is granted. The transaction holding the Delay lock is entered on a Delaying transaction list 250 for the requesting transaction. During commit processing for the transaction which requested the write lock, when the cohort must cast a transaction time vote, it consults this dependency list 250. Committed transactions on the dependency list are ignored, and if all transactions on the list 250 are committed, then all delay lock commit processing is bypassed. Otherwise, the latest value of LATEST of all the Delaying transactions becomes a lower bound on the EARLIEST vote for this cohort.

In the timestamping two phase commit protocol of the present invention, each database system (i.e., each node or cohort) is two phased with respect to lock acquisition. This local two phased property, together with Delay locks, ensures that locally conflicting transactions have disjoint prepare-intervals. Hence local transactions will have transaction timestamps ordered correctly locally. Globally, the commit protocol of the present invention ensures that the timestamp order of the transactions correctly orders transactions, because the timestamp order chosen agrees with all local serializations.

Essentially, two phase locking is used locally, up to prepare time, to order transactions. Then timestamp order concurrency control is used. This offers a high level of concurrency between transactions, with the efficiency of using the commit protocol itself to "quiesce" the transaction cohorts' normal activities, without a separate termination protocol. In addition, the present invention makes it possible to exploit the 2PC protocol messages to trigger delayed constraint evaluation (i.e., constraints that must be validated at the end of a transaction), while still assuring the serializability of transactions.

It should be noted that if timestamp ranges voted by the cohorts to a transaction are not sufficiently large, the probability that their intersection is empty, forcing the transaction to abort, increases. As more activity is permitted to follow the initiation of the commit protocol, more time must be allowed for cohorts to complete their diverse activities. This must be reflected in timestamp ranges that are voted by the cohorts.

TRANSACTION MANAGER

In some distributed database systems, not all cohorts of a transaction necessarily timestamp their data. The commit protocol for such systems must work correctly when transactions involve both timestamping and non-timestamping cohorts. If the non-timestamping cohort does not include a timestamp on its voting message, then a problem arises. Even though transactions are serialized correctly at each database, and a valid global serialization for all databases is assured, the timestamp order cannot be guaranteed to agree with a valid global serialization.

For example, transaction T1 executes at timestamping database A and non-timestamping database B. Transaction T2 executes at non-timestamping database B and timestamping database C. Transaction T1 commits at B prior to T2. However, the EARLIEST time voted for T1 at A is later than the EARLIEST time for T2 at C. Since there are no constraints established at B, these times can become the transaction times timestamped into A and B. They satisfy the local constraints at A and C, but they do not agree with a valid serialization of T1 and T2, which must have T1 ordered before T2.

To handle such hetergenous systems, and to make commit protocol processing more efficient, the present invention provides a transaction manager (TM) 220 in each node of the system. The transaction manager assists the local database system on each node to coordinate distributed transactions. It does this by presenting a strictly local interface to each database system through which the two phase commit protocol is exercised. The TM 220 performs all communications required by the commit protocol of the present invention. That is, all protocol messages have a source that is a TM at one node, and a destination that is a TM at another node.

A node's TM interfaces with all databases at the node, whether timestamping or non-timestamping. Hence, no database is the coordinator of the 2PC protocol. Since there is a TM at every node, any node can coordinate the transaction, whether or not a timestamping database is present at that node. Thus one of the TM's for each transaction is chosen as the coordinator TM for that transaction using any reasonably selection criteria. since the correctness of the protocol is not affected by which TM is selected.

Each database system notifies its local TM about commit initiation and voting. The coordinator TM examines votes. Based on the received votes it decides whether to commit or abort the transaction, and selects the transaction time. It then communicates to other remote participating TMs the transaction disposition and time. These TMs then inform their local participating databases of the transaction disposition and time. It should be noted that the coordinator TM handles the 2PC protocol messages for its local database by directly communicating with the database system at its node.

The solution to the problem of mixed timestamping and non-timestamping databases in the same transaction is for the TM to provide a timestamp vote should a database not inform the TM of an EARLIEST time. The TM maintains a LAST time value for each non-timestamping database system on its node, and votes an EARLIEST time which must be later than the later of LAST for the database involved in the transaction and the local clock time. For a non-timestamping database, the TM may or may not vote a LATEST time value. If the TM votes a LATEST time value, it does so in accordance with a predefined procedure, the details of which depend on the particular application that the TM is being used with.

By providing a TM, a database system need not know anything about timestamps. And the TM need not know anything about the database. The TM executes the timestamp selection protocol in the absence of a transaction time vote.

Having the TM vote a transaction time range of [EARLIEST, LATEST] for a transaction is straight-forward. It permits non-timestamping cohorts to take advantage of both the read-only optimization and the release of read locks, as discussed above. Both of these involve a database releasing read locks before a transaction is known to have terminated, either via a commit or abort.

One way for a TM to accomplish the above ordering is to guarantee that conflicting transactions are not simultaneously prepared. This is what Delay locks do. However, in a heterogeneous system having some non-timestamping databases, the TM cannot depend on all databases providing the assurance of correct ordering. Further, by using a simple TM interface, the TM is prevented from knowing the dependencies between transactions. Hence, the TMs guarantee correct timestamp selection by permitting no more than one transaction from such a database system to be in the prepared state at a time. One way to accomplish this is to have the TM require that one transaction commit before the next transaction is prepared.

Another approach is to exploit timestamp ranges. Transaction times will agree with transaction serialization if the transaction times are ordered in the same way as the times of prepare state entry. This can be achieved by insuring disjoint prepare intervals. When a TM votes an [EARLIEST, LATEST] timestamp range, the EARLIEST time must be later than not only the LAST commit time for the database, but also the latest LATEST upper bound voted by all currently prepared transactions. This may be accomplished by looking at the LATEST upper bound denoted in the TM's transaction table 224 for all prepared transactions. This is similar to the selection of an EARLIEST time vote when processing a "delayed" transaction, where the EARLIEST time must take into account the LATEST upper bounds of the transations listed in a delay list 250.

There is a third method of assuring disjoint intervals for conflicting transactions in non-timestamping databases. In particular, when the transaction manager communicates to the database that it should prepare, the database responds with a prepare vote (i.e., to commit or abort the transaction). Until the transaction manager acknowledges the database's prepare vote, processing of the transaction by the database will be suspended. The transaction managers for non-timestamping nodes can be programmed to delay acknowledging receipt of a prepare vote until the transaction is committed. In this way, the transaction will not release its locked resources until the transaction is committed, which assures proper sequential ordering of the transactions in the non-timestamping database. The above discussion demonstrates that the TMs of the present invention can cope with database systems that expect to use ordinary 2PC protocols and to release Read locks at prepare time.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A transaction management method for use in a distributed database system having a plurality of interconnected nodes, the steps of the method comprising:
(a) transmitting a prepare-to-commit message to each node in said system which is a cohort of a distributed transaction;
(b) each cohort of said distributed transaction receiving said prepare-to-commit message and then voting on a disposition of said distributed transaction, said disposition being selected from the set consisting of aborting said transaction and committing said transaction;
(c) each cohort voting to commit said transaction also voting a commit time range including an earliest time acceptable to said cohort for committing said transaction and a latest time acceptable to said cohort for committing said transaction;
(d) whenever said cohorts all vote to commit said transaction and said time ranges voted by said cohorts have a non-empty intersection, committing said transaction and selecting a transaction time for said transaction from the intersection of said time ranges voted by said cohorts;
(e) aborting said transaction whenever any of said cohorts vote to abort said transaction;
(f) aborting said transaction whenever said time ranges voted by said cohorts do not intersect; and
(g) repeating said steps (a) through (f) for a multiplicity of subsequent distributed transactions; and
in a first distributed transaction whose cohorts include a read-only cohort that updates no data values during said first distributed transaction, setting a read lock in said read-only cohort for each datum accessed by said read-only cohort while performing said first distributed transaction, storing in said read-only cohort data indicating that each said read lock was set by said first distributed transaction, and releasing each said read lock no later than the latest time voted by said read-only cohort for said first distributed transaction.

2. The method set forth in claim 1, further including the steps of:
maintaining at each said node of said system a local clock time;
wherein said earliest time voted by each said cohort to each said distributed transaction is not earlier than said cohort's local clock time.

3. A distributed database system, comprising:
a plurality of interconnected nodes, each said node including a database, a transaction manager that coordinates commitment of transactions in which said node is a cohort, and a lock manager that governs access to the database at said node;
said transaction manager on each node including means for:
preparing to commit transactions in which said node is a cohort and voting to commit each such transaction within a time range specified by an earliest acceptable time and a latest acceptable time;
selecting a transaction time for each transaction from the intersection of said time ranges voted by nodes that are cohorts to said each transaction; and
committing each said transaction at the transaction time selected for that transaction;
said lock manager including means for:
for each transaction, setting a read lock on each datum to which said each transaction has obtained read access;
allowing each transaction write access to data that has been read locked by another transaction, wherein said write access is allowed prior to termination of the other transaction but only after said transaction manager has prepared to commit said other transaction;
marking as a delayed transaction each transaction allowed write access to data that is read locked by another transaction; and
storing, with respect to each said delayed transaction, data representing a set of delaying transactions comprising transactions that have read locked data to which said delayed transaction has been allowed write access;
said transaction manager further including means for selecting said time range such that, for each said delayed transaction, said earliest acceptable time is later than (A) said selected transaction time of each said delaying transaction that has committed, and (B) said latest acceptable time voted by said transaction manager for each delaying transaction that has prepared but not yet committed.

4. A distributed database system as set forth in claim 3, including clock means, coupled to said voting means, for denoting a local clock time;
wherein said earliest acceptable time voted by said voting means is no earlier than said local clock time.

5. The distributed database system of claim 3,
said lock manager including means for releasing each said read lock no later than the latest acceptable time voted, by the transaction manager, for the transaction that set said read lock.

6. The distributed database system of claim 3, said lock manager including means for automatically releasing read locks set by transactions in which said node is a read-only cohort that updates no data values, wherein said read locks are released no later than the latest acceptable time voted by the transaction manager for the transaction that set said read lock.

7. The distributed database system of claim 3, said transaction manager including means for aborting a transaction whenever any of the cohorts of said transaction vote to abort said transaction, and means for aborting said transaction whenever said time ranges voted by said cohorts do not intersect.

8. The distributed database system of claim 3, said transaction manager including last time means for denoting a LAST transaction time comprising a latest one of said transaction times selected for transactions involving said cohort; wherein said transaction manager votes an earliest time which is later than said LAST transaction time.

9. The method set forth in claim 1, further including, at each node which is a cohort of a distributed transaction:
setting a read lock on each datum to which said distributed transaction has obtained read access;
allowing each distributed transaction write access to data that has been read locked by another distributed transaction, wherein said write access is allowed prior to termination of the other distributed transaction but only after said node has voted to commit said other transaction;
marking as a delayed transaction each transaction allowed write access to data that is read locked by another transaction; and
storing, with respect to each said delayed transaction, data representing a set of delaying transactions comprising transactions that have read locked data to which said delayed transaction has been allowed write access;
said step (c) including selecting said commit time range such that, for each said delayed transaction, said earliest acceptable time is later than (A) said selected transaction time of each respective delaying transaction that has committed, and (B) said latest acceptable time voted by said cohort for each delaying transaction that has not yet committed.

10. A distributed database system, comprising:
a plurality of interconnected nodes, each said node including a database, a transaction manager that coordinates commitment of distributed transactions in which said node is a cohort, and lock manager that governs access to the database at said node;
said transaction manager on each node including means for:
preparing to commit distributed transactions in which said node is a cohort and voting on a disposition of each such distributed transaction, said disposition being selected from the set consisting of aborting said each distributed transaction and committing said each distributed transaction; each vote to commit including an time range comprising an earliest time acceptable to said cohort for committing said each distributed transaction and a latest time acceptable to said cohort for committing said each distributed transaction;
selecting a transaction time for said each distributed transaction from the intersection of said time ranges voted by nodes that are cohorts to said each distributed transaction;
committing said each distributed transaction at the transaction time selected for that distributed transaction when all cohorts of that distributed transaction vote to commit that distributed transaction;
aborting each distributed transaction for which any cohort voted to abort said each distributed transaction; and
aborting said each distributed transaction whenever said time ranges voted by said cohorts to said each distributed transaction do not intersect; and
said lock manager on each node including means for:
setting a read lock on each datum located at said node and to which said each distributed transaction has obtained read access;
for each distributed transaction, setting a read lock on each datum located at said node and to which said each distributed transaction has obtained read access, and storing data in said node indicating which distributed transaction said read lock was set by; and
when said node is a read-only cohort of a first distributed transaction, releasing each said read lock in said read-only cohort which was set by said first distributed transaction no later than the latest time voted by said read-only cohort for said first distributed transaction.

11. A transaction management method for use in a distributed database system having a plurality of interconnected nodes,
the steps of the method comprising:
(a) transmitting a prepare-to-commit message to each node in said system which is a cohort of a distributed transaction;
(b) each cohort of said distributed transaction receiving said prepare-to-commit message and then voting on a disposition of said distributed transaction, said disposition being selected from the set consisting of aborting said distributed transaction and committing said distributed transaction;
(c) each cohort voting to commit said distributed transaction also voting a commit time range including an earliest time acceptable to said cohort for committing said distributed transaction and a latest time acceptable to said cohort for committing said distributed transaction;
(d) whenever said cohorts all vote to commit said distributed transaction and said time ranges voted by said cohorts have a non-empty intersection, committing said distributed transaction and selecting a transaction time for said distributed transaction from the intersection of said time ranges voted by said cohorts;
(e) aborting said distributed transaction whenever any of said cohorts vote to abort said distributed transaction;
(f) aborting said distributed transaction whenever said time ranges voted by said cohorts do not intersect; and (g) repeating said steps (a) through (f) for a multiplicity of subsequent distributed transactions; and setting a read lock on each datum to which said distributed transaction has obtained read access;

allowing each distributed transaction write access to data that has been read locked by another distributed transaction, wherein said write access is allowed prior to termination of the other distributed transaction but only after said node has voted to commit said other distributed transaction;

marking as a delayed transaction each distributed transaction allowed write access to data that is read locked by another distributed transaction; and storing, with respect to each said delayed transaction, data representing a set of delaying transactions comprising transactions that have read locked data to which said delayed transaction has been allowed write access;

said step (c) including selecting said commit time range such that, for each said delayed transaction, said earliest acceptable time is later than (A) said selected transaction time of each respective delaying transaction that has committed, and (B) said latest acceptable time voted by said cohort for each delaying transaction that has not yet committed.

* * * * *